May 31, 1927.
R. M. HILL
1,630,616
OPTICAL SYSTEM FOR PROJECTION APPARATUS
Filed Nov. 21, 1923
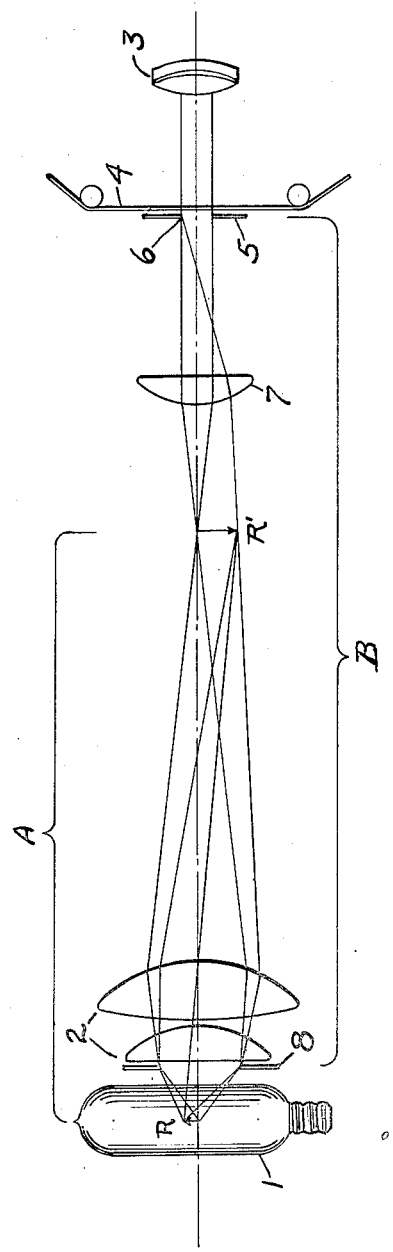
Inventor
Roger M. Hill Patented May 31, 1927.

1,630,616

UNITED STATES PATENT OFFICE.

ROGER M. HILL, OF WASHINGTON, DISTRICT OF COLUMBIA.

OPTICAL SYSTEM FOR PROJECTION APPARATUS.

Application filed November 21, 1923. Serial No. 676,089.

This invention relates generically to stereopticon, floodlight, cinema, and similar projecting apparatus, more especially it is directed to an optical system designed to increase the projecting efficiency of machines of this character.

One of the objects of this invention is to effect an optical system of the type indicated, affording greater concentration and a more uniform distribution of the light over the entire field of illumination.

Another object of this invention is to provide an optical system capable of forming an image of a predetermined light zone at or near the plane of the transparency.

A further object of this invention is to dispose an auxiliary lens intermediate the film aperture and radiant image so that a beam composed of parallel pencils and conforming in cross-section to the area of the film aperture is projected through the latter and into the objective.

Other objects of this invention are to provide an optical system which will function equally as well with large as with small radiants and which is especially applicable to apparatus using non-homogeneous radiants.

With these and other objects in view this invention consists in certain novel arrangements of parts to be more particularly hereinafter set forth and claimed.

Briefly stated, this invention comprises, in addition to the usual condenser and objective lens systems, an intermediate lens interposed between the image of the radiant and the plane of the transparency with its rear focal point coincident with the locus of the radiant image, to direct the rays in parallelism through the transparency and into the objective system.

Referring more especially to the accompanying drawing in which corresponding parts are indicated by similar reference characters, there is shown a diagrammatic view of the components of this improved optical system, illustrating the manner in which the intermediate lens functions to parallel the light rays.

In the projection of transparencies two systems are usually employed, one, the condenser, functioning to collect and direct the light rays from the radiant through the transparency, the other, the objective system serving to project an image of the transparency upon the screen.

At a predetermined point in the beam of light from the condenser system, an image of the radiant is formed and if this is homogeneous in construction, as for example the crater of an arc lamp, the beam will be of fairly uniform cross sectional area, but, should the radiant be of non-homogeneous nature such as the filament of an incandescent lamp manifestly the uniformity of the beam will decrease as the plane of the radiant image is approached.

In the projection of lantern slides and other large transparencies it is the prevailing practice to position the slide contiguous the condenser system and to locate the objective lens system immediately adjacent the plane of the radiant image. With this arrangement satisfactory results have been obtained, as the projected beam, being of uniform cross-sectional area near the condenser, regardless of the nature of the radiant, uniformly illuminates the slide.

In motion picture projection however, using a direct current arc lamp, the film aperture is usually disposed at or adjacent the image of the radiant, and as the latter is homogeneous the cross-sectional area of the condenser beam is approximately uniform throughout and fairly satisfactory results are obtained, despite the loss of certain marginal rays.

With projecting apparatus using an incandescent lamp it has been found impracticable to place the film aperture in the plane of the radiant image as the filament of the lamp would then be visible upon the screen. It is therefore necessary to locate the film aperture in the condenser beam some distance to the rear of the radiant image to eliminate, in so far as it is possible, the irregular illumination attributable to the presence of the filament image.

When standard condenser systems are employed the film aperture is usually situated at the most restricted point of the condenser beam, that is to say, in the plane of the greatest intersection of light rays. As the marginal rays of the beam at this point are not as concentrated as the central rays, they must be discarded with consequent loss of illuminating effect.

Various efforts have been made to avoid the defects mentioned, by using a corrugated lens system and other similar devices, but these attempts have not been entirely satisfactory.

It is therefore the aim and purpose of this invention to produce an optical system for projection purposes which will overcome the defects enumerated and materially improve screen illumination.

In the application of this invention all components with exception of an auxiliary condenser system and diaphragm hereinafter to be referred to, are conventional and in the illustrated embodiment comprise an incandescent lamp (1) having filament radiant R; a condenser system (2), an objective system (3) a transparency (4) and a diaphragm (5) immediately in advance of the transparency and having the usual film aperture for obvious reasons.

With the preceding systems suitably mounted in proper optical relation for projection, as shown in the drawing, there is formed at a definite point along the principal axis (indicated by brace A) a real image R' of the radiant which normally is projected upon the film with consequent irregular illumination.

Coming now to the inventive feature of this application, to avoid the effect on the film of the radiant image and provide for a greater utilization of the light rays, an auxiliary condenser system, in the present instance a lens (7) is located in the path of the condenser beam between the image R' of the radiant R and the diaphragm (5), with its rear focal point coincident with the image, to collect the rays and direct them in parallelism through the film aperture and transparency into the objective system as clearly shown in the drawing.

To limit the incident rays passing to the condenser, and ultimately the cross-sectional area of the beam at the film aperture (6), an auxiliary diaphragm (8) is interposed between radiant R, and condenser (2), as clearly shown in the drawing.

With this arrangement, the aperture in the diaphragm (8) is imaged coincident with that of diaphragm (5) (indicated by brace B) thus providing at the film aperture a luminous field of uniform intensity, having a cross-sectional area conforming to that of the aperture in diaphragm (5). In other words, instead of imaging the radiant immediately in advance of the objective system and projecting it on the screen as in prevailing types of projection apparatus, an image of a field of light defined by the opening in the diaphragm (8) is projected upon the film. As this light area is always of uniform intensity regardless of the character of the radiant, it is obvious that uniform illumination of the film will be obtained.

Moreover, with the proposed system, the beam of light is so restricted in cross-sectional area the possibility of fire as the result of excessive heating of exposed metallic surfaces adjacent the film is materially decreased. The film is further protected by virtue of being located a greater distance from the source of heat, the radiant, thus facilitating access to the film mechanism.

In conclusion it is evident this invention provides an inexpensive and simple expedient through the instrumentality of which a marked increase of screen illumination is effected without a corresponding increase in the candle power of the radiant.

Although in the foregoing certain components have been defined as best adapted to perform the functions allotted to them, nevertheless it is to be understood that various minor changes may be resorted to within the scope of the appended claims without departing from or sacrificing any of the principles of this invention.

Having described my invention what I claim as new and wish to secure by Letters Patent is:

1. In an illuminating system for projection apparatus, the combination with a radiant, a primary condenser system, a film aperture, an objective system to the front of the film aperture, the two systems being optically arranged with respect to each other, and the film aperture for projection purposes; of an auxiliary condenser interposed between the film aperture and the radiant image produced by the primary condenser, said condenser being of such focal length and so positioned with respect to the radiant image and the film aperture as to direct the light rays in parallelism through the film aperture into the objective system and at the same time effect in the plane of the film aperture an image of the light field immediately in advance of the primary condenser.

2. In an illuminating system for projection purposes the combination with a radiant, a primary condenser system, a film aperture, an objective system to the front of the film aperture, the two systems being optically arranged with respect to each other, and the film aperture for projection purposes; of an auxiliary condenser system disposed with its rear focal point coincident with the locus of the radiant image formed by the primary condenser system, to direct the light rays in parallelism through the film aperture and into the objective system and at the same time effect in the plane of the film aperture an image of the field of light immediately in advance of the entrance to the primary condenser.

3. In an illuminating system for projection apparatus the combination with a radiant, a primary condenser system, a diaphragm disposed between the radiant and primary condenser to limit the incident rays entering said system, a film aperture and an objective system to the front of the film aperture, the two systems being optically arranged with respect to each other, the diaphragm and film aperture for projection purposes; of an auxiliary condenser interposed between the film aperture and a radiant image formed by the primary condenser system, said condenser being of such focal length and so positioned with respect to the radiant image and the film aperture as to direct the light rays in parallelism through the film aperture and into the objective system and at the same time effect an image approximately in the plane of the film aperture of the field of light immediately in advance of the primary condenser system and defined by the diaphragm.

4. In an illuminating system for projection apparatus the combination with a radiant, a primary condenser system, a diaphragm disposed between the radiant and primary condenser to limit the incident rays entering said system, a film aperture and an objective system to the front of the film aperture, the two systems, being optically arranged with respect to each other, the diaphragm and film aperture for projection purposes; of an auxiliary condenser system located with its rear focal point coincident with the locus of the radiant image produced by the primary condenser system, to direct the light rays in parallelism through the film aperture and into the objective system and at the same time effect an image approximately in the plane of the film aperture of a field of light defined immediately in advance of the primary condenser by the diaphragm.

5. In an illuminating system for projection apparatus the combination with a radiant, a primary condenser system, a film aperture, an objective system to the front of the film aperture, the two systems being optically arranged with respect to each other and the film aperture for projection purposes; of an auxiliary condenser system interposed between the film aperture and the primary condenser, said condenser being of such focal length and so positioned with respect to the radiant image and the film aperture as to image at the plane of the film aperture the field of light at the entrance to the primary condenser system.

6. An illuminating system for projection apparatus the combination with a radiant, a primary condenser system, a diaphragm disposed intermediate the radiant and primary condenser system, a film aperture, an objective system to the front of the film aperture, the two systems being optically arranged with respect to each other and the film aperture for projection purposes, of an auxiliary condenser interposed between the film aperture and the primary condenser, said condenser being of such focal length and so positioned with respect to the radiant image and the film aperture as to image at the plane of the film aperture the field of light defined by said diaphragm.

ROGER M. HILL.